R. O. HENDRICKSON.
FRICTION CLUTCH.
APPLICATION FILED JULY 3, 1911.
1,101,280.
Patented June 23, 1914.
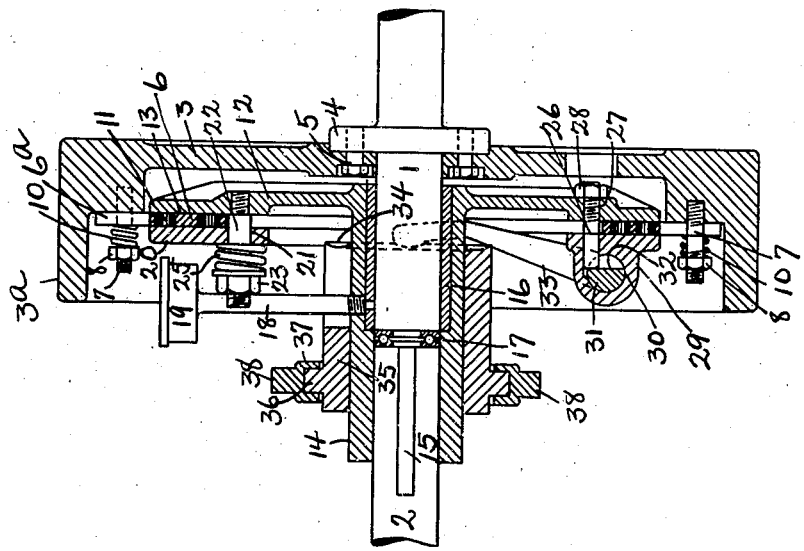
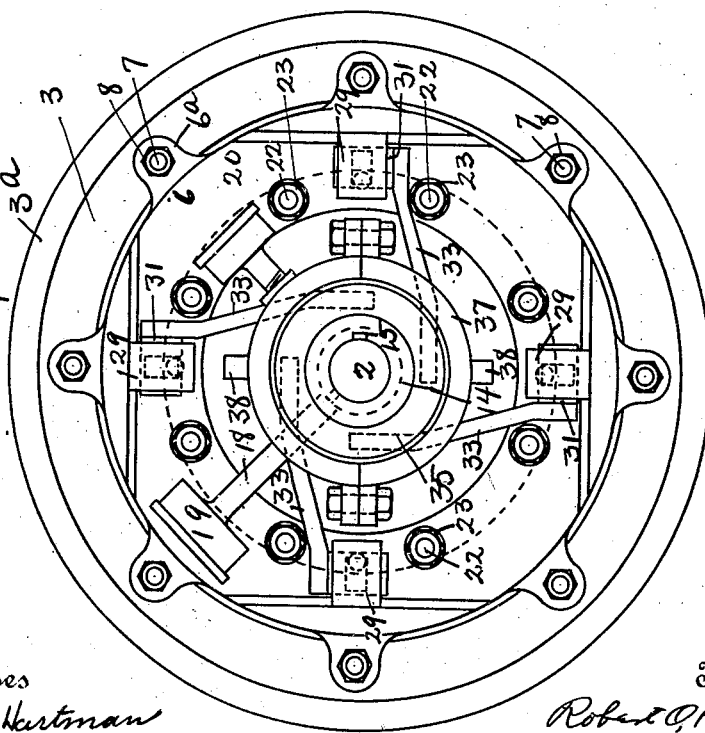
Witnesses
B. M. Hartman
Linnie C. Hess
Inventor
Robert O. Hendrickson
by N. R. Lund
Attorney

UNITED STATES PATENT OFFICE.

ROBERT O. HENDRICKSON, OF PORTLAND, OREGON, ASSIGNOR, BY MESNE ASSIGNMENTS, TO WALLIS TRACTOR COMPANY, OF RACINE, WISCONSIN, A CORPORATION OF WISCONSIN.

FRICTION-CLUTCH.

1,101,280.   Specification of Letters Patent.   Patented June 23, 1914.

Application filed July 3, 1911. Serial No. 636,813.

*To all whom it may concern:*

Be it known that I, ROBERT O. HENDRICKSON, a citizen of the United States, residing at Portland, in the county of Multnomah and State of Oregon, have invented new and useful Improvements in Friction-Clutches, of which the following is a specification.

This invention relates to friction clutches, and consists in certain improvements in the construction thereof as will be hereinafter fully described and pointed out in the claims.

The clutch is particularly designed for use in traction engines and in connection with internal combustion motors, and in this relation it is spring actuated to throw the clutch into engagement and lever operated to throw the clutch out of engagement.

The invention is illustrated in the accompanying drawings as follows:

Figure 1 shows a side elevation of the clutch. Fig. 2 a central section through the clutch, the line of section varying to give a section of each of the details.

In the operation of the clutch, either member may be the driven member or the driving member. For the convenience of description, it will be assumed that the shaft 1 is the driving shaft and the shaft 2 the driven shaft. A web 3 is fixed on the shaft 1 by being secured by bolts 5 to a shoulder 4 on said shaft. The web 3 is provided with an annular flange 3ª. A driving friction plate 6 is secured to the web 3 within the flange 3ª by means of bolts 7. The plate 6 is provided with the ears 6 for this purpose. The bolts are provided with the ends 8 and springs 10 are arranged between the ends and plate 6ª so as to relieve the parts from any warping strain. The plate 6 has a series of perforations and the friction blocks 11 are arranged in these perforations. A driven friction plate 12 having the friction surfaces 13 engages the friction blocks 11 at one side of the plate 6. The plate 12 is carried by a hub 14. The hub is fixed on the shaft 2 by means of a key 15 and is provided with the bushings 16 forming a bearing on the shaft 1. A ball bearing washer 17 is arranged between the shafts 1 and 2. The bearing formed by the bushing 16 is lubricated from a grease cup 19 which is connected with the bearing through the pipe 18. A friction plate 20 is arranged at the opposite side of the plate 6 from the plate 12. It has a series of perforations 21 through which bolts 22 extend and are screwed into the plate 6. Nuts 23 are screwed on to the bolts 22 and springs 25 are interposed between the nuts 23 and the plate 20. These springs throw the clutch into engagement and are of sufficient power for this purpose. Push pins 26 are screwed into the screw threaded openings 27 in the plate 12 and are locked in position by the nuts 28. These push pins extend into the ears 29 on the plate 20. The ears have perforations through them extending in a circumferential direction and pins 31 are journaled in the perforations 30. The pins are flattened at 32 and the push pins 26 engage these flattened surfaces at one side of the pin. By rocking the pins 31, the flattened portions operate as a crank on the push pins 26 and thus separate the friction plates 12 and 20. Levers 33 are fixed on the pins 31. These levers extend to the sides of the hub 14, the levers being arranged tangentially to the head. They are operated upon by the surface 34 at the end of the sliding sleeve 35. The sleeve 35 has the annular shoulder 36 on which is arranged the strap 37. The strap is provided with the usual pins 38 by means of which the sleeve 35 may be operated.

It will be readily observed that when the sleeve 35 is forced toward the right, as shown in Fig. 2, the levers 33 are rocked so as to swing the flattened surfaces 32 against the push pins 26. The effect of this is to separate the plates 12 and 20. Upon the release of the sleeve 35, the springs 25 operating through the bolts 22 pull the plates 12 and 20 toward each other and against the friction blocks 11, thus setting the clutch.

What I claim as new is:

1. In a friction clutch, the combination of a driving friction plate, driven friction plates at opposite sides of the driving plate, means for impelling the driven plates toward each other and toward the intermediate driving plate, push pins mounted on one of the driven plates and extending past the driving plate, cylindrical rock shafts journaled in the other driven plate and cut away to form bearing surfaces for the respective push pins, arms on said rock shafts and means for engaging the arms to oscillate the shafts and cause the latter through the push pins to separate the friction plates.

2. In a friction clutch, the combination of a driving plate, a pair of driven plates upon opposite sides thereof, means for normally forcing the driven plates toward each other and into engagement with the driving plate, bearings formed on one of the driving plates, oscillatory shafts mounted in said bearings, arms on said shaft, means for engaging said arms to oscillate the shafts, said shafts being cut away within their bearings to form eccentric surfaces, push pins mounted upon the other driven plate and extending past the driving plate through openings in the shaft bearings and into engagement with the cutaway portions of said shaft whereby oscillation of the shaft will force apart the driven plates.

3. In a friction clutch, a driving friction plate, a driving shaft by which said plate is carried, a driven shaft, a driven friction plate mounted thereon, pins extending from said driven friction plate, an annular friction plate slidably mounted on said pins, springs forcing said annular plate and driven plate toward each other, cylindric bearings formed on said annulus, cylindrical shafts mounted in said bearings and having cutaway portions engaging the pins, arms on the shaft for oscillating the same and an axially-sliding sleeve engaging the arms for operating the same.

4. A driving shaft and a driven shaft axially alined end to end, an annular driving friction plate mounted on the driving shaft, a main driven friction plate mounted upon the driven shaft and loosely sleeved upon the end of the driving shaft, pins on said main driven plate extending beyond the driving plate, an annular friction plate slidable upon said pins, means normally forcing said annular plate and main driven plate toward each other and into contact with the driving plate and rock shafts having eccentric portions engaging said pins, arms on said rock shafts and a collar movable axially of the shafts for engaging said arms to force the driven friction plates apart.

5. A driving shaft, a driven shaft, a wheel upon the driving shaft, a driving friction plate mounted on the wheel, spring means forcing the driving friction plate into contact with said wheel, a pair of driven friction plates mounted on the driven shaft and arranged on opposite sides of said driving friction plate, springs forcing said driven friction plates toward each other and into engagement with the driving plate, pins mounted on one of said driven plates, rock shafts journaled on the other of said driven friction plates and having eccentric portions engaging said pins, arms on said rock shafts and means movable axially of the shafts engaging said arms for rocking the shafts and separating the driven friction plates against the pressure of the springs.

In testimony whereof I have hereunto set my hand in the presence of two subscribing witnesses.

ROBERT O. HENDRICKSON.

Witnesses:
H. V. CARPENTER,
ELIJAH CORBETT.